(12) United States Patent
Chou

(10) Patent No.: US 7,688,521 B2
(45) Date of Patent: Mar. 30, 2010

(54) LENS ACTUATOR

(75) Inventor: Tai-Hsu Chou, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 12/341,348

(22) Filed: Dec. 22, 2008

(65) Prior Publication Data

US 2009/0284854 A1 Nov. 19, 2009

(51) Int. Cl.
*G02B 15/14* (2006.01)

(52) U.S. Cl. ..................................................... 359/694

(58) Field of Classification Search ........... 359/694, 359/821–824; 396/79, 85, 729; 348/345, 348/376, 374

See application file for complete search history.

(56) References Cited

U.S. PATENT DOCUMENTS

2006/0181748 A1* 8/2006 Makii et al. ................. 358/500

* cited by examiner

*Primary Examiner*—Joseph Martinez
(74) *Attorney, Agent, or Firm*—Clifford O. Chi

(57) ABSTRACT

A lens actuator includes a lens barrel for accommodating the lens, a coil wrapped around the lens barrel, at least one magnet, a bracket, and a resilient plate. The bracket is configured for mounting the magnets thereon and accommodating the lens barrel therein. The resilient plate is connected between the bracket and the lens barrel to hold the lens barrel on the bracket. The bracket includes an outer wall and an inner wall. At least one slit is defined between the outer wall and the inner wall. At least one opening is defined in the inner wall spatially corresponding to the at least one slit. The at least one magnet received in the at least one slit and exposed to an inside of the bracket through the at least one opening.

17 Claims, 7 Drawing Sheets

LENS ACTUATOR

CROSS REFERENCE TO RELATED APPLICATION

This application is related to a commonly-assigned copending application Ser. No. 12/192,376, entitled "resilient plate and lens actuator with same". Disclosures of the above-identified application are incorporated herein by reference in its entirety.

BACKGROUND

1. Technical Field

The present invention relates to lens actuators, and particularly, to a voice coil motor type lens actuator.

2. Description of Related Art

Variable focal length lenses are widely used in optical systems. Optical systems incorporating such lenses can, for example, provide focused images of objects at varying distances without adjusting the distance between the lens and the image plane. Variable focal length lenses can also be used in optical systems to provide varying magnification without change of lenses.

Generally, the optical system usually includes an actuator, such as a step motor, to drive the lenses. However, the step motor is relatively large in volume. Use of the step motor requires a significant amount of space for movement of the lenses, which makes the optical system bulky.

Therefore, what is needed is a lens actuator adapted for driving the lenses with more compact structure and less mechanical movement.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION OF THE EMBODIMENTS

Figure 1:
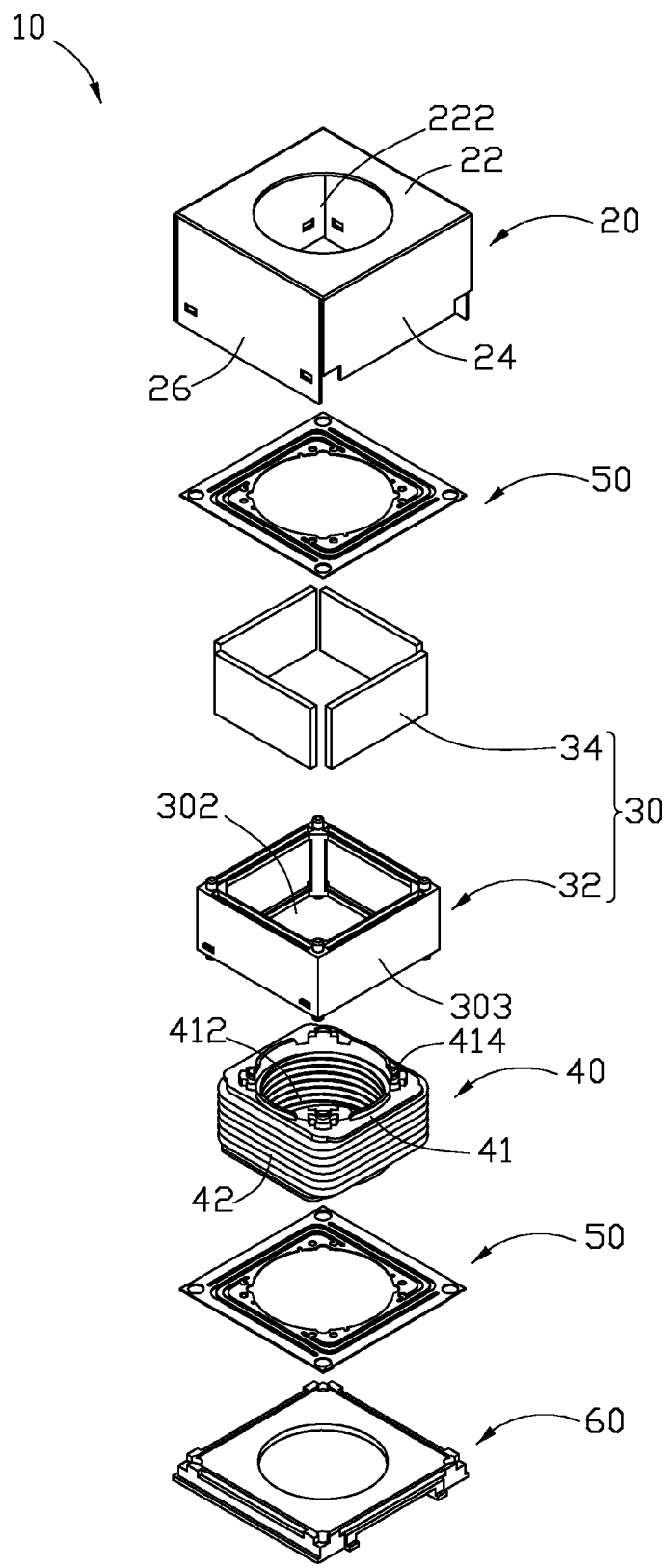
FIG. 1 is an exploded view of a lens actuator according to a first embodiment, the lens actuator including a fixed unit and two resilient plates, the fixed unit including a bracket.

Referring to FIG. 1, a lens actuator 10, in accordance with a first embodiment, includes a housing 20, a fixed unit 30, a movable unit 40, two resilient plates 50 and a plate 60.

The housing 20 includes a panel 22, a through hole 222 defined in the center of the panel 22, two opposite first peripheral panels 24 and two opposite second peripheral panels 26 respectively perpendicularly extending from four sides of the panel 22 and fastened to one another by use of dovetail panel joints (not shown). The panel 22, the first peripheral panels 24, and the second peripheral panels 26 cooperatively define a cavity for accommodating the fixed unit 30. It is understood that the housing 20 also can be cylinder shaped. The housing 20 is made of an electromagnetic shielding material, such as nickel alloy, conductive plastic, surface conductive material, conductive glass, etc.

Figure 2:
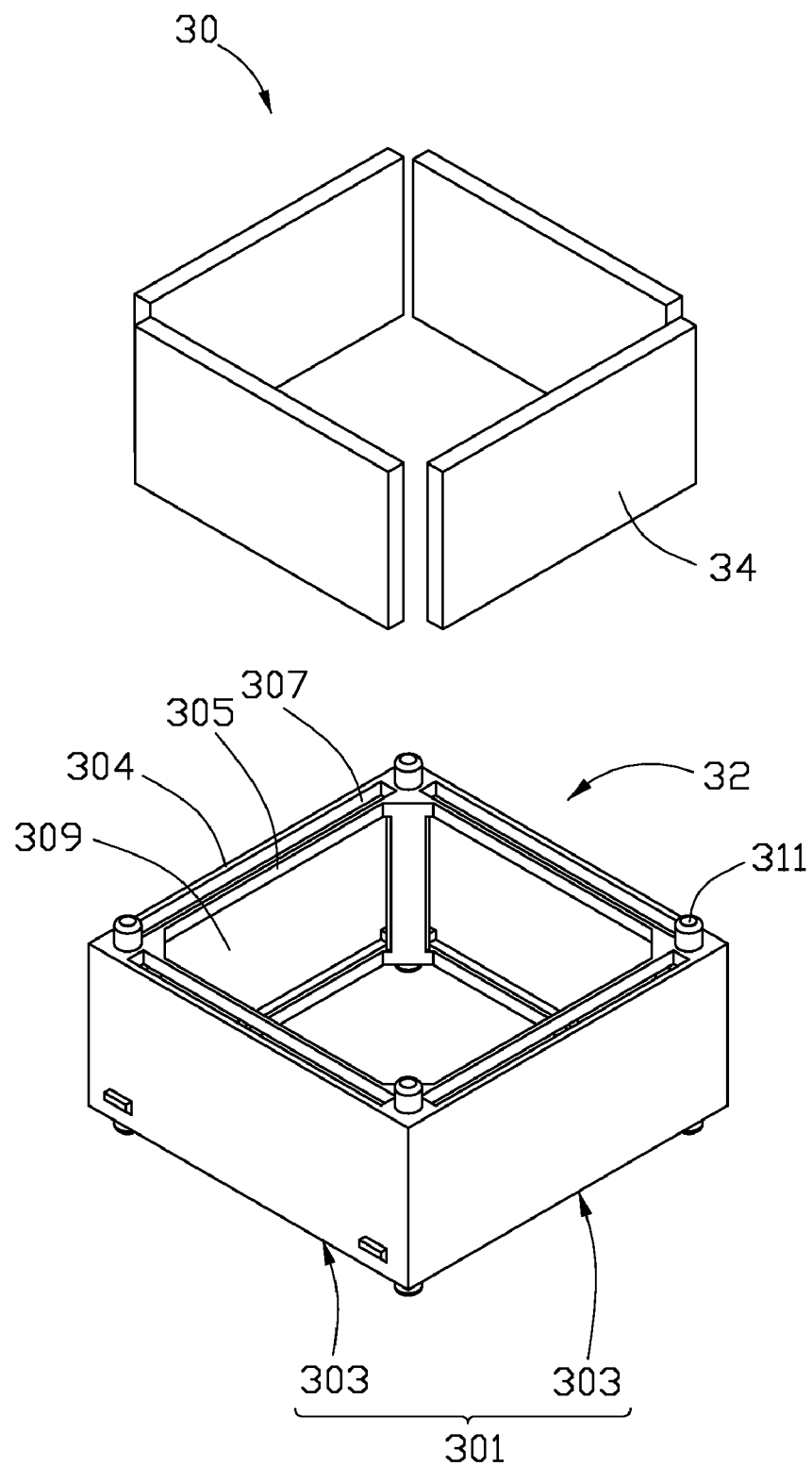
FIG. 2 is an exploded view of the fixed unit in FIG. 1.
Figure 3:
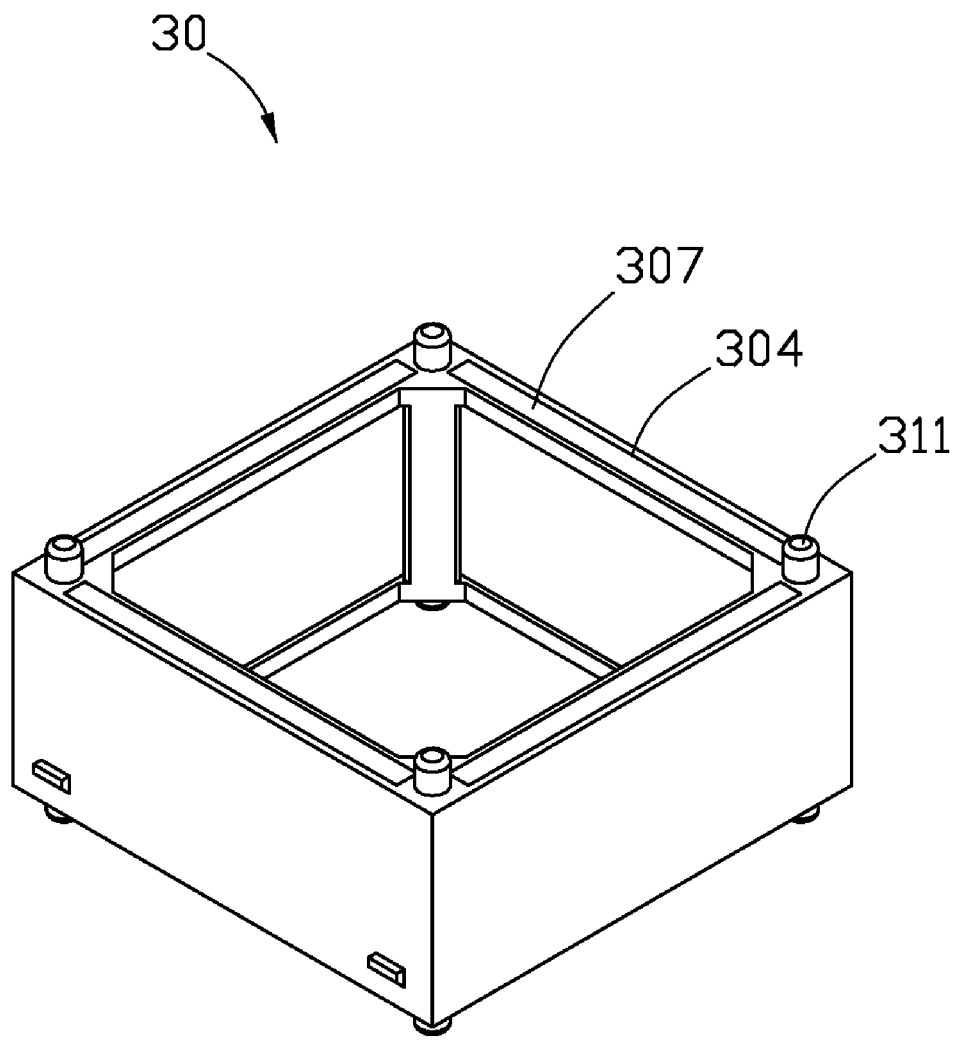
FIG. 3 is a schematic isometric view of the fixed unit in FIG. 1.

Referring to FIGS. 2 and 3, the fixed unit 30 includes a cubic bracket 32 and a plurality of magnets 34. The bracket 32 includes a frame body 301 receivable in the housing 20. A first accommodating room 302 is defined in the frame body 301. The frame body 301 includes four side panels 303. The side panels 303 can be fastened to one another by use of dovetail panel joints or adhesive. The side panels 303 also can be integrally formed with each other. Each of the panels 303 has an outer wall 304, an inner wall 305, and a slit 307 defined between the outer wall 304 and the inner wall 305. Each magnet 34 can be matingly mounted in the corresponding slit 307. An aperture 309 is defined in the inner wall 305. The position of the aperture 309 corresponds to that of the magnet 34 received in the slit 307. Four first locating pins 311 are respectively vertically protruded from the top and bottom sides of the frame body 301 at four corners thereof. The first locating pins 311 are configured for fastening the fixed unit 30 to one of the resilient plates 50. It is to be understood that, the outer walls 304 also may be define at least one aperture therein.

Referring to FIG. 1, the movable unit 40 includes a lens barrel 41 and coils 42 wrapped around the lens barrel 41. The movable unit 40 is accommodated in the first accommodating room 302 of the bracket 32. The lens barrel 41 defines a second accommodating room 412 for accommodating lenses and filters (not shown). The second accommodating room 412 is a through hole. Four locating pins 414 protrude from the top surface of the lens barrel 41.

Figure 4:
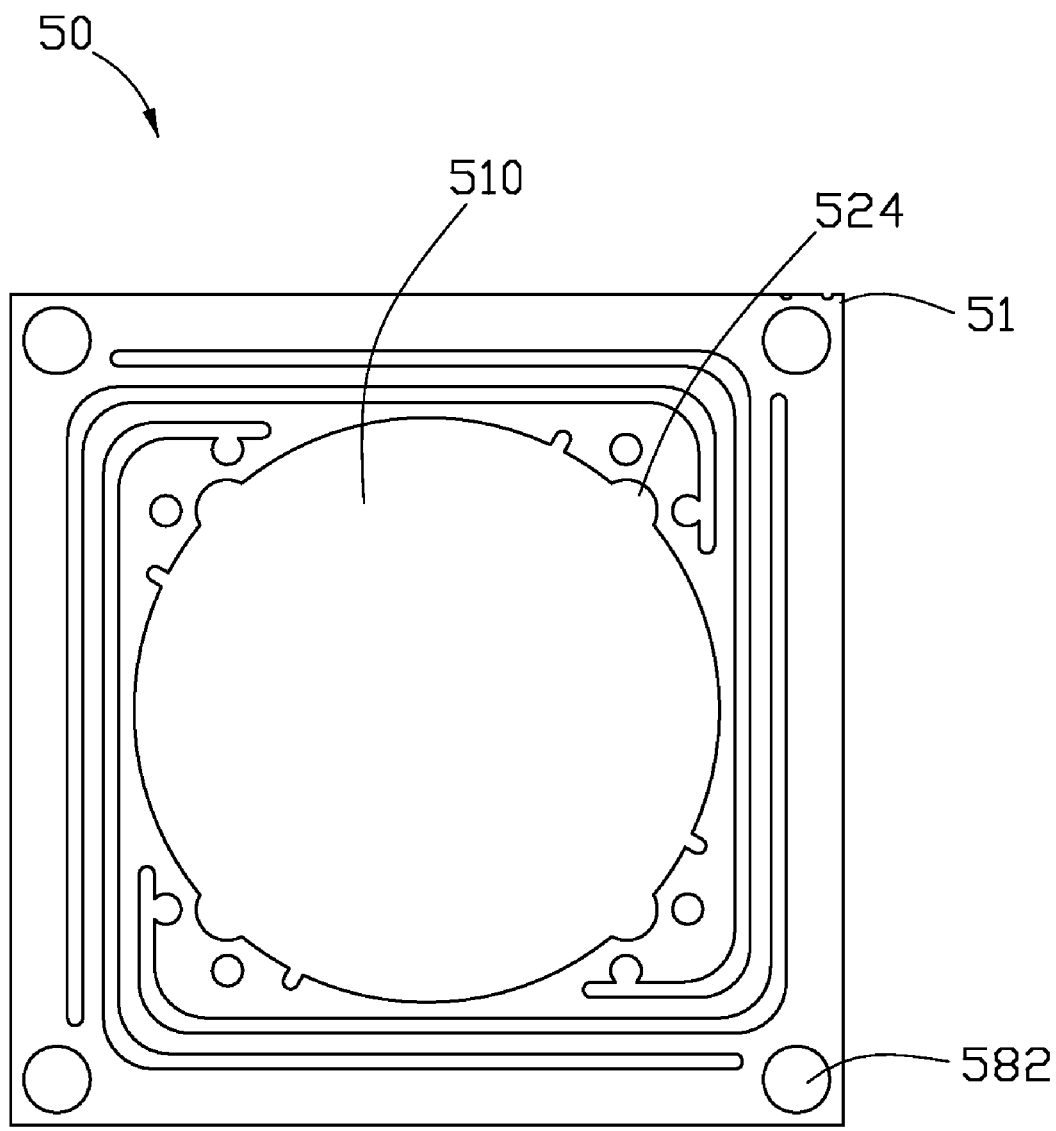
FIG. 4 is a schematic, isometric view of the resilient plate in FIG. 1.

Referring to FIG. 4, each of the resilient plate 50 comprises a main body 51. In the present embodiment, the main body 51 is substantially square shaped. The main body 51 can also be circular. A second through hole 510 for light passing therethrough is defined at the center of the main body 51.

Cutouts or through holes 524 are defined around the edge of the second through hole 510 corresponding to the locating pins 414 of the lens barrel 41. One of the resilient plates 50 is fastened to the top or bottom side of the lens barrel 41 by engagement of the cutouts or through holes 524 with the respective locating pins 414. The main body 51 further defines four holes 582, each located at one corner corresponding to one of the first locating pins 311. The other one of the resilient plates 50 is fastened to a top side of the bracket 32 by engagement of the holes 582 with the first locating pins 311.

The board 60 is fastened to the distal ends of the first locating pins 311 at one side of the bracket 32 opposite to the panel 22 of the housing. The board 60 and the housing 20 cooperatively package the fixed unit 30, the movable unit 40, two resilient plates into the first accommodating room 302.

When an electric current is applied to the coils 42, the coils 42 are excited to act upon the magnets 34, thereby producing a magnetic force to drive the lens barrel 41 to move between the resilient plates 50.

When electric current is cut off from the coils 42, the resilient plates 50 impart a pressure to the lens barrel 41 relative to the bracket 32, thereby returning the lens barrel 41 to its original position.

Further, the housing 20 and the board 60 protect the lens barrel and image sensor (not shown) against containments such as dust.

Figure 5:
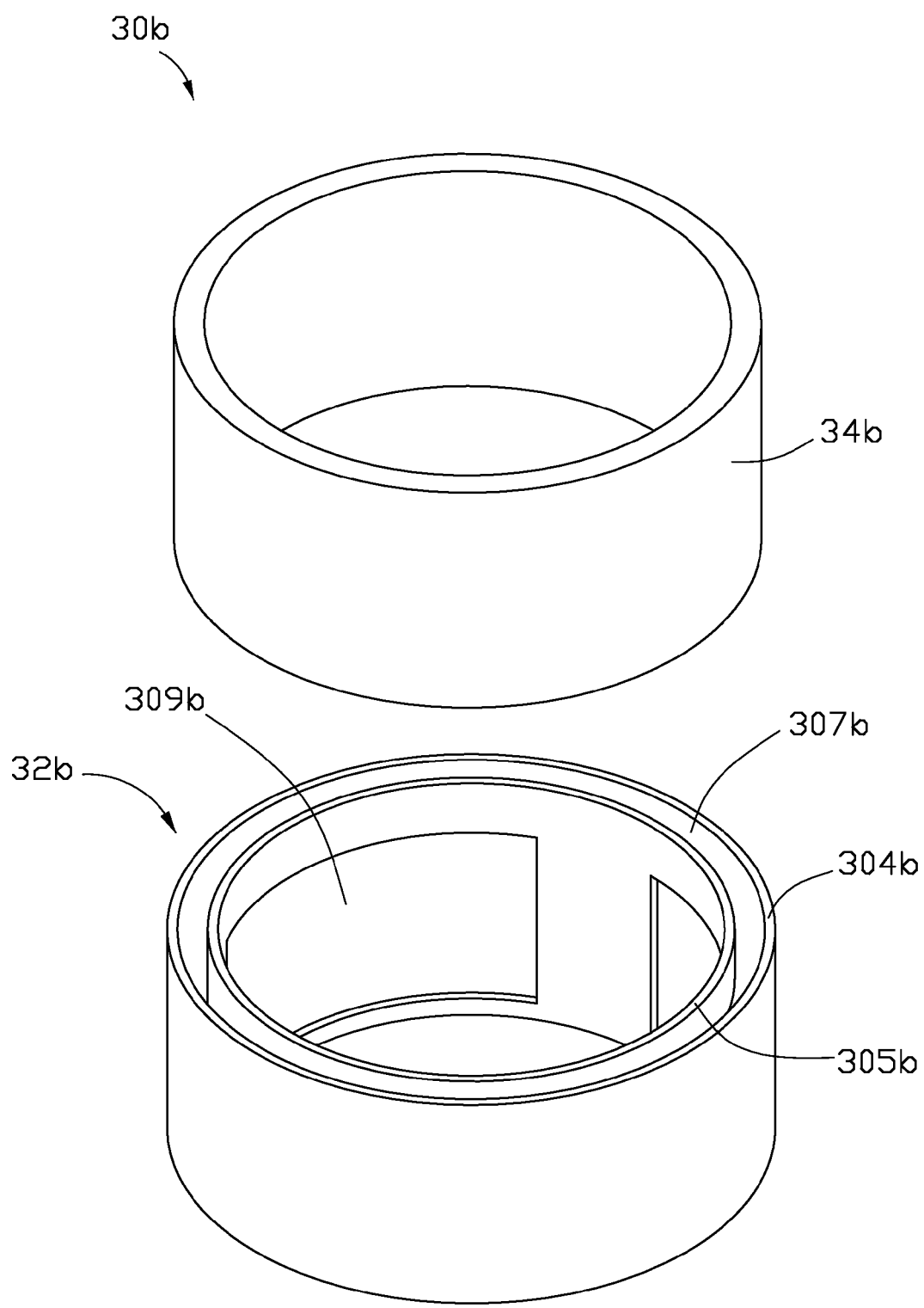
FIG. 5 is an exploded view of a fixed unit according to a second embodiment.

Referring to FIG. 5, a fixed unit 30b, in accordance with a second embodiment, includes a substantially cylinder shaped bracket 32b and a substantially cylinder shaped magnet 34b. The bracket 32b has an outer wall 304b, an inner wall 305b, and a slit 307b defined between the outer wall 304b and the inner wall 305b. The magnet 34b can be matingly mounted in the slit 307b. A plurality of apertures 309b is defined in the inner wall 305b.

Figure 6:
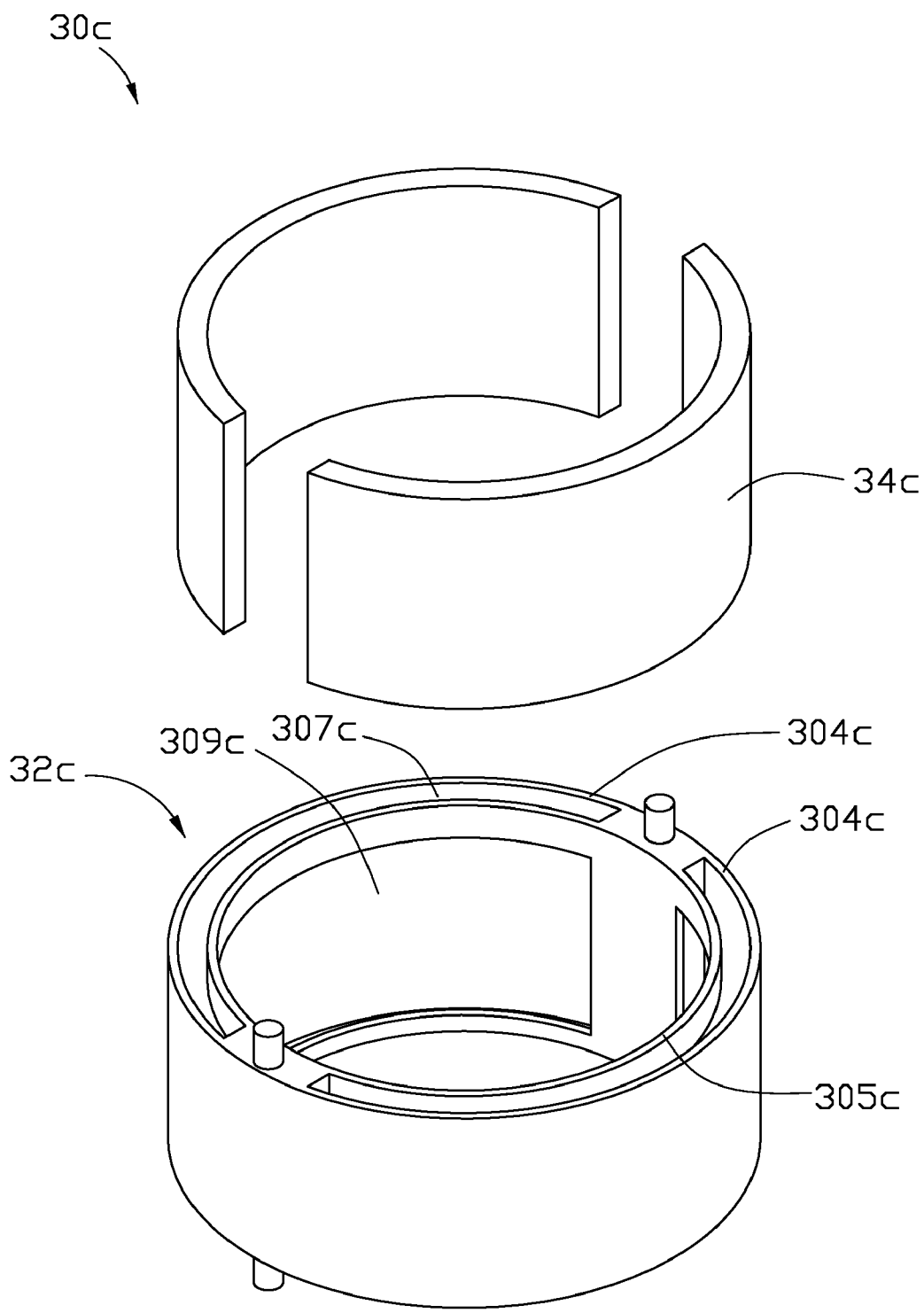
FIG. 6 is an exploded view of a fixed unit according to a third embodiment.

Referring to FIG. 6, a fixed unit 30c, in accordance with a third embodiment, includes a substantially cylinder shaped bracket 32c and two substantially arc shaped magnets 34c. The bracket 32c has an outer wall 304c, an inner wall 305c, and two substantially arc shaped slits 307c defined between the outer wall 304c and the inner wall 305c. Each magnet 34c can be matingly mounted in the corresponding slit 307c. Two apertures 309c are defined in the inner wall 305c. The position of each aperture 309c corresponds to the corresponding magnet 34c received in the slit 307c.

Figure 7:
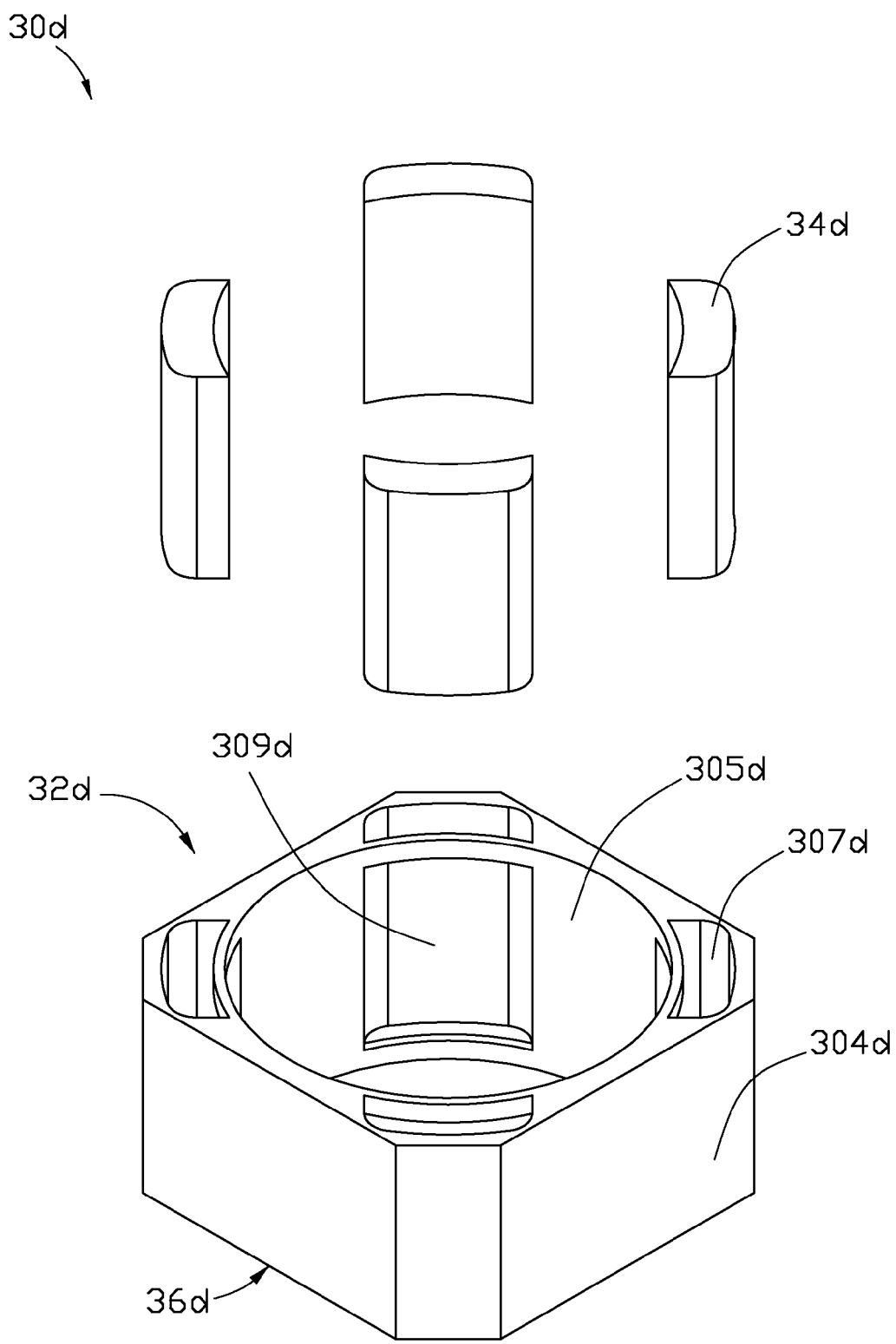
FIG. 7 is an exploded view of a fixed unit according to a fourth embodiment.

Referring to FIG. 7, a fixed unit 30d, in accordance with a fourth embodiment, includes a substantially cubic bracket 32d and four magnets 34d. The bracket 32d has an outer wall 304d, a cylindrical inner wall 305d, and four slits 307d defined at each corner of the bracket 32d. Each magnet 34d can be matingly mounted in the corresponding slit 307d. Four apertures 309d are defined in the inner wall 305d. The position of each aperture 309d corresponds to the corresponding magnet 34d received in the slit 307d.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A lens actuator, comprising:
    a lens barrel accommodating a lens,
    a coil wrapped around the lens barrel,
    a plurality of magnets,
    a bracket mounting the magnets thereon and accommodating the lens barrel therein,
    a resilient plate connected between the bracket and the lens barrel to hold the lens barrel on the bracket, and
    a through hole defined in the center of the resilient plate,
    wherein the bracket comprises an outer wall, an inner wall, a plurality of slits defined between the outer wall and the inner wall, the magnets are matingly received in the respective slits, and a plurality of openings defined in the inner wall with portions of each of the magnets exposed to an inside of the bracket via the openings.

2. The lens actuator as claimed in claim 1, wherein the bracket is substantially cubic.

3. The lens actuator as claimed in claim 2, wherein the slits comprise four slits distinctly oriented from each other.

4. The lens actuator as claimed in claim 1, wherein the bracket is substantially cylinder shaped, and the magnets are substantially arc shaped.

5. The lens actuator as claimed in claim 1, wherein the resilient plate comprises a plurality of pinholes defined in the periphery portion thereof the bracket comprises a plurality of first positioning pins corresponding to the pinholes and protruded out from the bracket, and the resilient plate is fastened to the bracket by engagement of the pinholes with the first positioning pins.

6. The lens actuator as claimed in claim 5, wherein the resilient plate further comprises a plurality of cutouts defined in the edge of the through hole, the lens barrel comprises a plurality of second positioning pins corresponding to the cutouts and protruded out from the lens barrel, and the resilient plate is fastened to the lens barrel by engagement of the cutouts with the second positioning pins.

7. The lens actuator as claimed in claim 5, further comprising a housing accommodating the bracket therein.

8. The lens actuator as claimed in claim 7, wherein the housing is comprised of an electromagnetic shielding material.

9. The lens actuator as claimed in claim 5, wherein the bracket is substantially cubic.

10. The lens actuator as claimed in claim 9, wherein the slits comprise four slits distinctly oriented from each other.

11. The lens actuator as claimed in claim 5, wherein the bracket is substantially cylinder shaped, and the magnets are substantially arc shaped.

12. A lens actuator, comprising:
    a lens barrel for accommodating a lens, a coil wrapped around the lens barrel, at least one magnet, a bracket for mounting the at least one magnet thereon and accommodating the lens barrel therein, and a resilient plate connected between the bracket and the lens barrel to hold the lens barrel on the bracket,
    wherein the bracket comprises an outer wall, an inner wall, at least one slit defined between the outer wall and the inner wall, and at least one opening defined in the inner wall spatially corresponding to the at least one slit, the at least one magnet received in the at least one slit and exposed to an inside of the bracket through the at least one opening, the outer wall of the bracket is substantially cubic, the inner wall of the bracket is substantially cylinder shaped, and the at least one slit includes four slits arranged at respective four corners of the bracket.

13. The lens actuator as claimed in claim 12, further comprising a housing accommodating the bracket therein.

14. The lens actuator as claimed in claim 13, wherein the housing is comprised of an electromagnetic shielding material.

15. A lens actuator, comprising:
    a lens barrel for accommodating a lens,
    a coil wrapped around the lens barrel,
    a plurality of magnets,
    a bracket accommodating the lens barrel therein, and
    a resilient plate connected between the bracket and the lens barrel to hold the lens barrel on the bracket,
    wherein the bracket comprises an outer wall, and an inner wall, the magnets sandwiched between the outer wall and the inner wall, the bracket including a plurality of openings defined in the inner wall with portions of each of the magnets exposed to an inside of the bracket via the respective openings, the outer wall of the bracket is substantially cubic, the inner wall of the bracket is substantially cylinder shaped, and the magnets are arranged at respective four corners of the bracket.

16. The lens actuator as claimed in claim 15, further comprising a housing accommodating the bracket therein.

17. The lens actuator as claimed in claim 16, wherein the housing is comprised of an electromagnetic shielding material.

* * * * *